United States Patent
Losiewicz et al.

(10) Patent No.: US 7,301,967 B2
(45) Date of Patent: Nov. 27, 2007

(54) METHOD AND APPARATUS FOR PROCESSING CUSTOM TIME DIVISION MULTIPLEXED SIGNALS

(75) Inventors: Paul B. Losiewicz, New Hartford, NY (US); Christopher P. Kaiser, New York Mills, NY (US); Clinton E. Park, Stitville, NY (US)

(73) Assignee: The United States of America as represented by the Secretary of the Air Foece, Washington, DC (US)

( * ) Notice: Subject to any disclaimer, the term of this patent is extended or adjusted under 35 U.S.C. 154(b) by 1081 days.

(21) Appl. No.: 10/320,697

(22) Filed: Dec. 13, 2002

(65) Prior Publication Data

US 2004/0114629 A1 Jun. 17, 2004

(51) Int. Cl.
*H04J 4/00* (2006.01)
*H04J 3/06* (2006.01)

(52) U.S. Cl. ........................... 370/478; 370/512

(58) Field of Classification Search ........ 370/476–478, 370/352, 522, 204, 535, 345, 350, 343, 458, 370/498, 503, 509, 512

See application file for complete search history.

(56) References Cited

U.S. PATENT DOCUMENTS

| 4,680,775 | A  | * | 7/1987  | Exarque et al. ............. 375/261 |
| 6,297,691 | B1 | * | 10/2001 | Anderson et al. .......... 329/300 |
| 6,314,112 | B1 | * | 11/2001 | Hsu et al. .................. 370/477 |
| 6,760,578 | B2 | * | 7/2004  | Rotzoll .................... 455/343.2 |

* cited by examiner

*Primary Examiner*—Doris H. To
*Assistant Examiner*—Feben Micael Haile
(74) *Attorney, Agent, or Firm*—Joseph A. Mancini

(57) ABSTRACT

Method and apparatus for processing time division multiplexed (TDM) signals which may be custom in format. The TDM signal is translated to an intermediate frequency, or externally demodulated, input, and processed. Individual channels of either analog, digital or both are output. Since the configuration of the processor is software controlled, different TDM signals may be processed without reconfiguring hardware.

16 Claims, 3 Drawing Sheets

METHOD AND APPARATUS FOR PROCESSING CUSTOM TIME DIVISION MULTIPLEXED SIGNALS

STATEMENT OF GOVERNMENT INTEREST

The invention described herein may be manufactured and used by or for the Government of the United States for governmental purposes without the payment of any royalty thereon.

BACKGROUND OF THE INVENTION

Signal multiplexing is becoming increasingly widespread. Many new custom multiplexing structures are being developed. The communications market demands inexpensive, high-quality, flexible systems worldwide to meet growing customer demands. A summary of several of the digital multiplexing methods being used is provided for background purposes.

Time Division Multiplexing (TDM)

Time division multiplexing is a method of transmission where all individual users share the same available bandwidth divided into time segments or time slots (see FIG. 1). Today there are many different types of multiplexors. Some maintain a standard structure and some are custom configured specifically for the user. Multiplexing structures have some basic characteristics in common such as synchronization, time slots and channel allocations, frame rates, and frame widths. Any or all of these characteristics may be altered to create a new multiplexing structure. Alteration of a single binary bit in the synchronization, frame width, frame rate or time slot and channel allocation can create an entirely new multiplexor that cannot be processed using standard demultiplexor equipment.

Time Multiplexing and Signal Generation

A description for a generic multiplexor is provided below. There are several steps required to digital time multiplex channels of data. All the channels must be digitally formatted. If the channels are analog, i.e., voice, etc., they must be converted through an analog to digital process in order to represent the signal in a digital manner. If the channels are already in digital format then they are ready for multiplexing. Once digital preparation is complete, the channel is then assigned its placement within a framed period of time.

A simple multiplexor frame consists of a binary pattern utilized for time reference sync code at the beginning of the frame followed by a series of timeslots (see FIG. 1). Synchronization may take several frames or several time slots within the frame along a matrix. Timeslots may also be allocated on a multiple frame matrix as well.

The frame is sent at a continuous constant rate, maintaining proper synchronization by the sync code. The timeslots not utilized by the sync code are then available for channel occupation. These timeslots can be allocated to a channel of data individually or in combination to achieve multiple data rates. The number of time slots utilized for each channel is dependent on the needs of the user and the flexibility of the multiplexing equipment.

After the frames have been generated, the data is streamed to a modem for addition of transmission protocols such as forward error correction, randomization and modulation. Common modulations multiplexors use are: on-off keyed, frequency shift keyed, minimum shift keyed, bi-phase shift keyed, quaternary shift keyed, quaternary amplitude modulation and gaussian minimum shift keyed. Basically multiplexors may use any modulation that can be used for binary transmission.

The new signal is sent to a receiving demultiplexor (see FIG. 2) after it is modulated in an analog transmission ready form. The process for demultiplexing and receiving the data in its original format is the reverse of the multiplexing process. The entire multiplexing transformation process is transparent to the users of the multiplexing system.

Prior Art Processing of Time Division Multiplexing (TDM) Signals

Presently, the demultiplexing of TDM signals is based upon single-purpose, fixed solution approaches. Each time a new situation is encountered, it is necessary for the user to manually analyze the signal. After manual analysis the user must then develop an automated or semi-automated system to process that specific TDM signal. This approach has proven to be costly and ineffective as systems are rapidly evolving and being deployed.

Present TDM demultiplexing approaches are hardware intensive and hardware specific. This results in inflexible and expensive systems that are developed to meet a single need specific to the single type of demultiplexing structure. Development dollars become tied up in unwieldy hardware solutions. A simple change in the structure of the multiplexor of interest has the potential to render past solution hardware processing components completely useless.

OBJECTS AND SUMMARY OF THE INVENTION

It is therefore an object of the present invention to provide a method and apparatus for processing time domain multiplexed (TDM) signals that is configurable through software so as to accommodate such signals that are not necessarily in standardized format.

It is a further object of the present invention to provide a method and apparatus to provide a TDM processing system that does not require changing the hardware subsystems each time it is desired to process a signal of different format.

It is yet another object of the present invention to analyze and determine whether the contents of a TDM signal are voice, digital data, noise, modem data, or unknown.

It is still yet another object of the present invention to output a processed TDM signal in both digital and analog format.

Briefly stated, the present invention provides a method and apparatus for processing time division multiplexed (TDM) signals which may be custom in format. The TDM signal is translated to an intermediate frequency, input, and processed or the TDM signal may be externally demodulated, input, and processed. Individual channels of either analog, digital or both are output. Since the configuration of the processor is software controlled, different TDM signals may be processed without reconfiguring hardware.

According to an embodiment of the present invention, method for processing custom time division multiplexed signals comprises the steps of: translating input frequencies to an intermediate frequency range, if necessary; determining whether a PSK or a FSK/OOK modulation-type signal is present; demodulating the signal using the determined modulation-type so as to produce a digital data bit stream; stripping and decoding digital protocol from the digital data bit stream; synchronizing frames of the digital data bit stream; assigning the synchronized frames of digital data to channels; extracting the channel-assigned frames of digital data into individual channel streams; formatting the individual channel streams into a-law format; remultiplexing the formatted channel streams; analyzing the channel streams to determine their contents; reformatting and outputting the channel streams; demultiplexing the reformatted channel streams; converting the demultiplexed channel streams to analog channels; and outputting the analog channels.

According to a feature of the present invention, method for processing custom time division multiplexed signals, further comprises the step of remultiplexing in which a sync byte is added to each frame and idle bit patterns are added to unused channels so as to complete the requisite thirty one channels for a standard E1 frame.

According to another feature of the present invention, method for processing custom time division multiplexed signals, further comprises the step of analyzing so as to identify whether the channel contents are voice, digital data, modem, noise, VFT or unknown.

According to yet another feature of the present invention, method for processing custom time division multiplexed signals, further comprises the step of reformatting and outputting the channel streams in either TTL, LVDS format or HDB3 format.

These and other objects, features and advantages of the present invention will be readily apparent to one skilled in the pertinent art from the following detailed description of a preferred embodiment of the invention and the related figures, in which like reference numerals designate the same elements.

DETAILED DESCRIPTION OF THE PREFERRED EMBODIMENT

Figure 1:
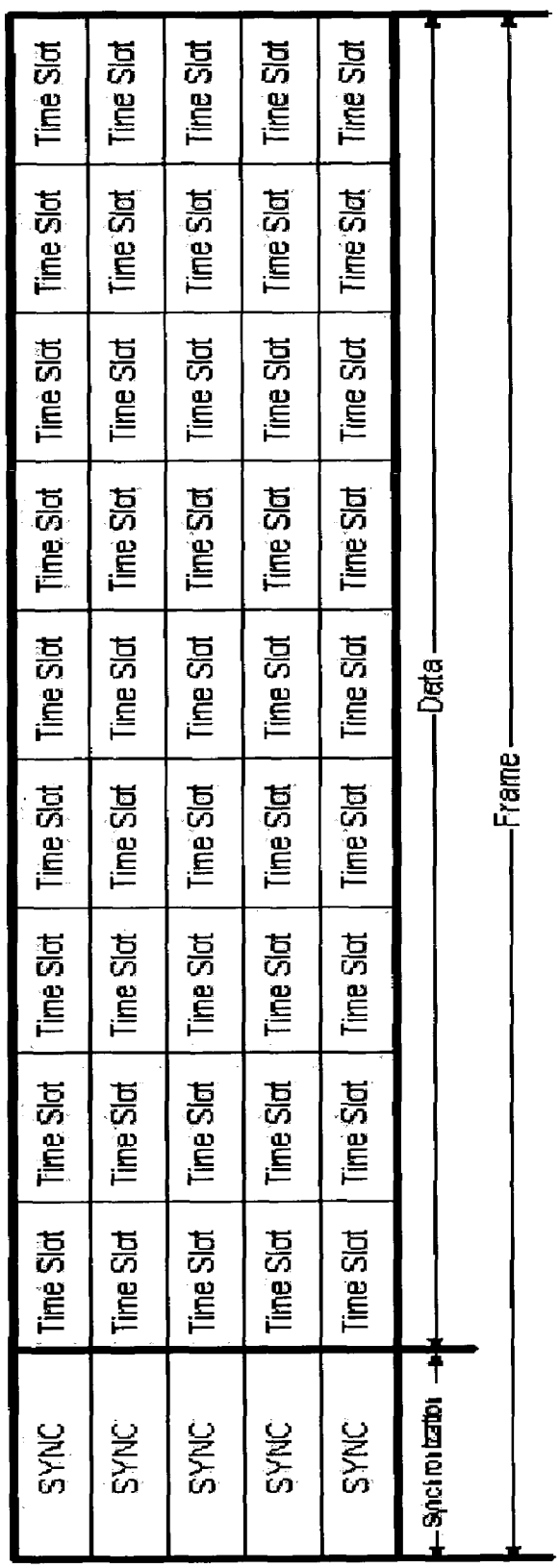
FIG. 1 depicts a typical time domain multiplexing (TDM) data frame.
Figure 2:
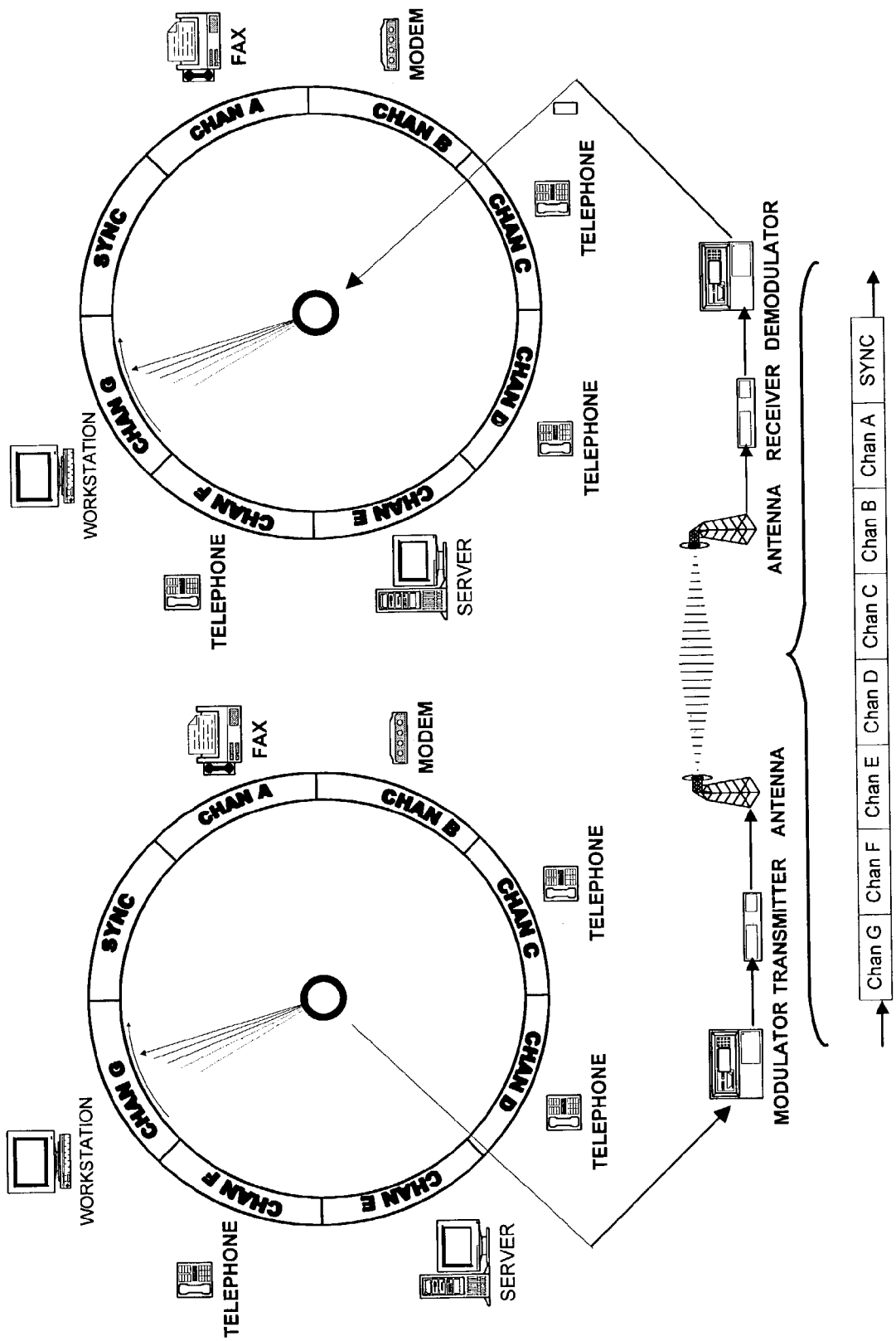
FIG. 2 depicts a typical time domain multiplexing (TDM) transmission and receiving scheme.

The present invention provides a method and apparatus for processing custom time division multiplexed signals. The present invention compares very favorably to the previous methods because it is primarily a software-based approach. It offers processing solutions for TDM signals that currently have no solution to some users. The user's only option is to use the present invention to process these existing custom or new multiplexed schemes or build an expensive hardware suite for each type. With the present invention, changes in processing architecture are accomplished by analyzing the signal with widely deployed signal processing and visualization software. The present invention performs TDM processing regardless of its structure, forgoing the need for new or custom real-time TDM hardware to accomplish the same.

The key to the present invention is its software-based method for demultiplexing TDM signals. The de-multiplexor formatting software runs on generic PC processors. The present invention provides solutions for processing any new TDM signals as they are discovered. Using software-based processing enables the flexibility needed to process the new custom structured multiplexed signals. All that is necessary for processing initiation is for the user to analyze the new signal and generate the text-based configuration, and they have instantly developed a new processing solution. Saving the script allows instant re-use as required. Its flexibility enables the present invention to replace many of the fixed solutions for processing new TDM signals as they arise. The user no longer needs a different processing suite for each and every type of multiplexor. The present invention can process the majority of TDM types using simple text based files to configure the multiplexing scheme. It offers a single solution for a multitude of demultiplexor processing needs instead of using a multitude of fixed solutions as in the past. Common analysis tools automatically generate text based configuration descriptions that are typically used for most processing applications. Manual generation of the scripts can also be done quite easily.

The flexibility of the software enables the capability to process TDMs within channels of TDMs. If a TDM channel is a time division multiplexed system, there is no need to bring on new hardware specific to that channel's multiplexing scheme. The software will process all the TDM systems within channels of the TDMs, regardless of their structure with potentially infinite applications (there is no structural limit). It will process them at any level (channels of channels of channels, etc.).

Overall size is another advantage of the present invention. The platform is a 4U rack mount industrial style computer. It contains all necessary front-end processing including, but not limited to intermediate frequency (IF) translation, demodulation and modem protocol processing to provide the multiplexed stream to the AFRL developed software based flexible demultiplexor. All of the front-end processing is flexible and user-selectable, allowing for full range of data rates, forward error correction options, derandomization, general decoding and other critical functions. By incorporating the front-end processing capability in the basic unit, the overall footprint is compressed. When a higher order modulation is encountered, the present invention will accept digital input from an external demodulator. This allows for processing adaptation and upgradability.

Previously a processing scheme for a TDM signal processor occupied an entire 7-foot rack. The present invention occupies to a small 7-inch high by 19-inch wide by 24-inch deep space. Again, due to its processing flexibility, it replaces a multitude of fixed demultiplexed signal processing suites with its all-in-one solution occupying a single slot in a standard 19-inch equipment rack. Depending on the user processing needs, using the present invention could compress the processing equipment footprint by an order of magnitude.

Configuration save and restore is a must for flexible systems used by personnel without a technical background. Once a TDM signal is analyzed and is properly processed using the present invention, the configuration set-up can be saved for reuse whenever the same or similar signal situation is encountered. These saved configuration files are in a text format and can be restored at any time in seconds.

The present invention is based on PC×86 architecture. It is housed in a 7-inch high by 19-inch wide by 24-inch deep industrial rack mount PC. The PC consists of standard PC options.

Intermediate Frequency Input, Translation and Modem Protocol Processing

Figure 3:
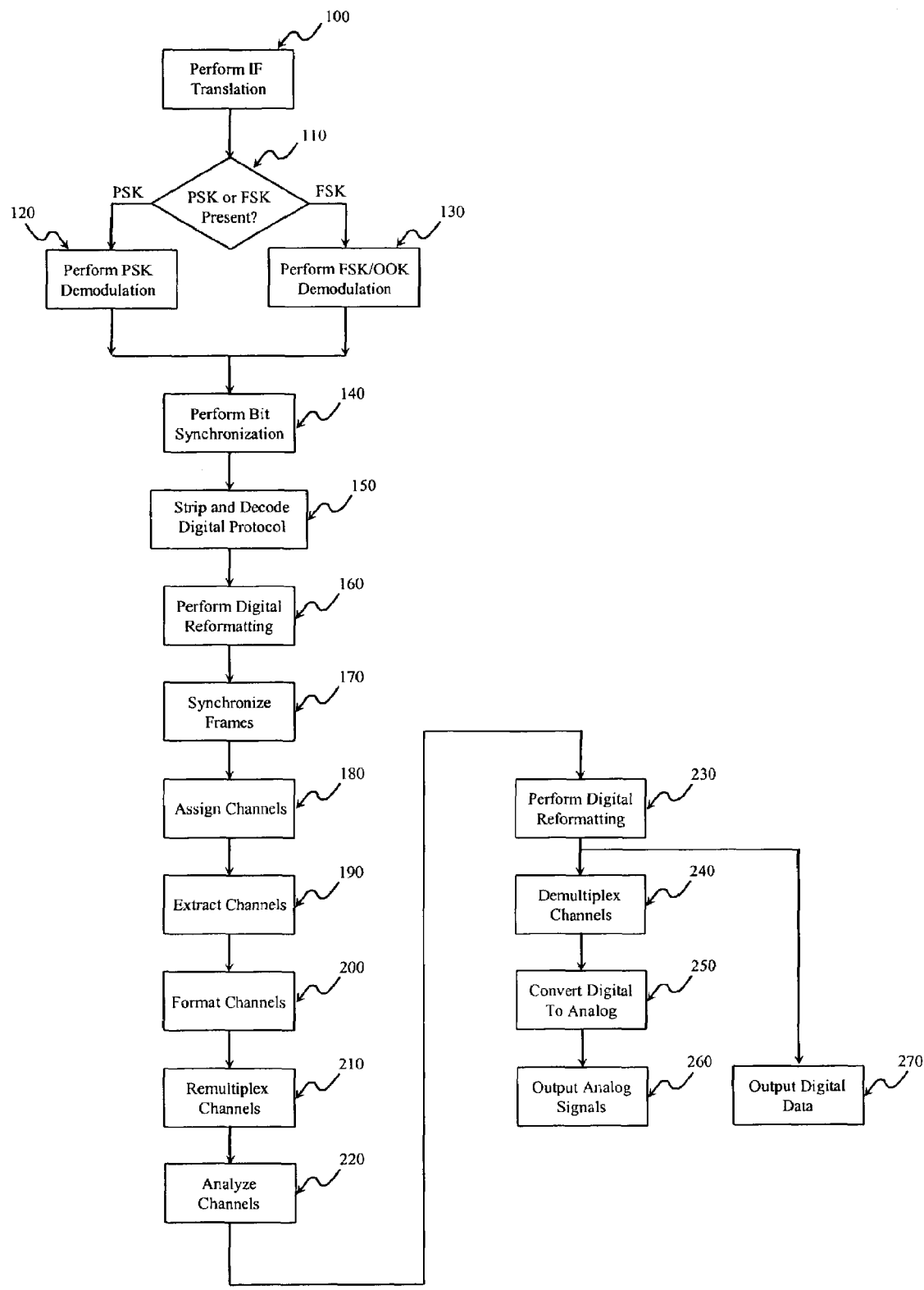
FIG. 3 depicts the process flow of the present invention.

Referring to FIG. 3, the present invention accepts a wide range of down converter or receiver IF outputs. Input ranges from 10 KHz to 25 MHz do not require IF translation. Inputs in the range of 40-170 MHz are frequency translated 100 using a ST-512 IF translator ISA board manufactured by Filtronic, formerly SIGTEK Inc. The ST-512 down converts (i.e., translates) the 40-170 MHz center-tuned 8 MHz bandwidth frequencies down to a 10 MHz centered IF that is compatible with the Filtronic ST-105 BPSK/QPSK Demodulator/Bitsync (10 KHz-25 MHz input to ST-105). The ST-512 10 MHz IF output is physically connected to the ST-105 using a RG-58 cable with male SMA connector ends. The J2 connector is connected with the RG-58 cable to input one on the ST-105.

Phase-shift keying (PSK) is a digital modulation scheme that conveys data by changing or modulating the phase of a reference (carrier) signal. Common examples of phase-shift keying (PSK) are binary phase-shift keying (BPSK) and quadrature phase-shift keying (QPSK). BPSK uses two phase states whereas QPSK uses four phase states. Digital information is conveyed in either BPSK or QPSK upon the detection of the phase of the carrier signal changing from a first to a second phase state in BPSK or from a first to a second, third or fourth phase state in QPSK.

If it is determined 110 that PSK modulation is present (i.e., BPSK or QPSK), then the PSK demodulation is performed 120 using a ST-105 demodulator ISA board manufactured by Filtronic. The demodulator has two software switchable IF inputs ranging from 10 KHZ to 25 MHz. The first input is connected to the ST-512 and the second input is generally connected to a wideband tape player for tape playback processing. The ST-105 will demodulate many forms of PSK modulations with symbol rates ranging from 2.4 KBPS to 3.8 MBPS. Some of its key features are user programmable symbol to bit mapping, burst and continuous mode acquisition, and several user programmable bandwidth filters. The ST-105 outputs the demodulated signal bit stream in TTL format using the top 20 pin IDC style J3 connector designed for connection to the top 20 pin IDC J6 connector on the ST-106 decoder board.

Frequency-shift keying (FSK) is a form of frequency modulation in which the modulating signal shifts the output frequency between predetermined values of frequency. Digital information is conveyed for each frequency transition from one frequency value to the other.

On-off keying (OOK) is a type of modulation that represents digital data as the presence or absence of a carrier signal. In OOK, digital information is conveyed at each transition between the presence of a carrier signal and the non-presence of a carrier signal.

If it is determined 110 that FSK or OOK modulation is present, then FSK/OOK demodulation is performed 130 using a PCI-6800 bitsync manufactured by Avtec Systems. This bitsync will acquire FM detected FSK modulated signals or AM detected OOK signals from 0.1 to 10 Volts at data rates from 100 BPS to 5 MBPS.

The detected PSK or FSK signal is then bit synchronized 140 with a corresponding rate clock and output in TTL format. Bit synchronization is a method by which an analog bauded signal is synchronized with a clocking signal. The approximate baud rate is known or measured and input into the bit synchronization step 140 during bit synchronization 140, the data signal is automatically measured and synchronized based on the average minimum time occurring between rising and falling, and falling and rising edges of the voltage transitions. The average time of the baud transition is measured to predict rising and falling edges of the data transition state so as to align a clocking signal with the data signal. This clocking signal is generally a reference signal for the system. This process renders the digital value (1 or 0) of the analog signal. The data and clock signals are output on the rear DB15F connector. A DB15M to RG-58 SMA male connector cable is used to output TTL format data and clock signals. The SMA male connectors are connected to the ST-106 decoder board as input to its J1 (data) and J2 (clock) rear SMA female connectors.

Digital bit stream protocol stripping and decoding is performed 150 using the ST-106 ISA board manufactured by Filtronic. The ST-106 provides multiple inputs. A top 20 pin IDC style J6 connector is used to acquire demodulated data in TTL format from the ST-105 and the rear female J1 and J2 female SMA connectors to acquire demodulated data in TTL format from the PCI-6800. Additional configurations to accept data from external demodulator input are accomplished by using the J8, J5, J1 and J2 connectors. The ST-106 has many programmable processing options which can be chosen between the four processing blocks. Some of the processing capabilities are forward error detection and correction, programmable derandomization, differential decoding, take and skip bits, and data synchronization. It provides four software switchable inputs and three outputs in RS-422 or TTL format. A cable with a DB9 to 60-pin D connector is used to route the stripped decoded RS-422 data to the PCI-CD20.

Digital reformatting is performed 160 to prepare the digital data stream for further processing. A data stream is often in an incorrect format due to acquisition of a line coded signal or an inverted polarity state. In the present invention digital reformatting converts the data stream to a Non-Return-to-Zero format were a digital "1" equals "1" and where a digital "0" equals "0". The present invention can convert Manchester, Bi-Phase Mark, and Inverted Non-Return-to-Zero to correctly polarized Non-Return-to-Zero format.

Digital I/O, Frame Synchronization, Demultiplexing and Data Formatting

Digital input of the RS-422 signals from the ST-106 decoder board are input to the computer for on-board processing using the PCI-CD20 manufactured by Engineering Design Team. The data is input by the rear 60-pin D connector and routed across the PCI buss to allow software processes to be run against the data internally on the computer.

Frame synchronization 170 is the first of the software processes performed. This frame synchronization is fully user programmable in terms of defining frame size, synchronization method, binary pattern used and synchronization location in time. It can be adapted to any form of synchronization utilized by a TDM scheme of transmission. The synchronization process uses buffered input and thus can compensate for a lost sync or otherwise interrupted signals of short duration.

The software process next performs channel assignment 180 or demultiplexing is the next step performed by the software processes. After synchronization 170 has been determined for a solid reference point, the frame elements are assigned 180 and extracted 190 into individual channel streams. This allocation is fully user programmable for designation of the location and time values in bit locations from the synchronization. After the channel has been extracted, it is then routed to the conversion process for channel formatting 200.

Channel formatting 200 converts the native audio type to a common 8 KHz sampled, 8 bit a-law format. The channel formatting process 200 is capable, but not limited to converting λ-law, 16 bit two's complement, 8 bit two's complement, ADPCM, and other various vocoders. This processing creates an a-law data stream corresponding to each digitized analog channel stream created during the demultiplexing process.

A process is performed to remultiplex 210 the a-law and data streams. For each frame a sync byte is added. Idle byte patterns are also added to each of the unused channels to complete the 31 channels needed for a standard E1 frame. A copy of this E1 data stream is sent to the channel analysis process for channel identification while another may be sent optionally to the output process. A channel may also be sent to the onboard sound card for easy monitoring. This unified software based approach to frame synchronization, demultiplexing and data formatting affords a user-configurable capability processing TDM signals.

Channel Analysis Identification and Digital and Analog Output

All channels are analyzed 220 automatically with a response time of less than 4 seconds (time is due to delay necessary for data acquisition for analysis). Channel analysis 220 identifies whether the channel contents are voice, digital data, dial-up modem, leased line modem, and the modem or VFT types, as well as activity, unknown and noise.

Non-analog VGC channel data may be output 270 in RS-422 format from the PCI-CD20, LVDS from the PCI-CD60 or converted LVDS from the INT-9951 E1 demultiplexor manufactured by Intronics Inc in the form of TTL or HDB3. The PCI-CD60 outputs 270 the LVDS data and clock signals using a cable with a 60-pin D connector attached to the PCI-CD60 rear connection and two Twinax LVDS data and clock signals output ends. The E1 LVDS stream is routed to a special I/0 box twinax connector input for the INT-9951. The 31 Analog Voice Grade Channels (VGC) are demultiplexed 240, analog-to-digital (A/D) converted 250, and output 260 as individually channelized analog signals from the INT-9951 to the special I/0 box female BNC connectors. The 31 analog channel outputs are software-selectable to enable the user to route the channel outputs to any or all of the 31 analog BNC outputs. A selectable left and right channel monitor output (2 channel) on the PC soundcard is also provided.

Software Control

The mux application comprises the main software application within the present invention. It controls all sub processes and can be initiated from either a command line interface or a graphical user interface (GUI). The GUI is separated from the present invention stream processing/analysis application to allow independent operation if a GUI is not necessary.

The present invention can be configured with standard Unix style command options. These options include data source (CD20 or a bit file), input data type, demultiplex control script, optional raw (unprocessed data collect) file name and optional data output (CD-60).

The channel processor/analyzer and Avtec PC-6800 card within the present invention may be controlled by a graphical user interface. The application is written using the GTK+/Gnome programming APIs. This allows for cross platform (operating system) capabilities.

This main software application controls the processing of TDM signals and allows for easier selection of the input data types and standard demultiplex scripts. The user is given a choice of acquiring raw data for later analysis, real-time analysis of a data stream or a combination of both. It also provides the user with graphical and textual feedback from the analysis subprocess. Control of the INT-9951 and audio output is also integrated into the analysis display to allow for channel redirection and monitoring based on this analysis information. Control of the Avtec bit sync is also integrated into the GUI.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. A method for processing time division multiplexed signals comprising the steps of:
   translating input frequencies to an intermediate frequency range, if necessary;
   determining whether a Phase Shift Keyed (PSK) or a Frequency Shift Keyed (FSK) or On-Off Keyed (OOK) modulation-type signal is present;
   demodulating said signal using said determined modulation-type so as to produce a digital data bit stream;
   bit synchronizing said digital data bit stream with a rate clock;
   stripping and decoding digital protocol from said digital data bit stream;
   digitally reformatting said digital data bit stream;
   synchronizing frames of said digital data bit stream;
   assigning said synchronized frames of digital data to channels;
   extracting said channel-assigned frames of digital data into individual channel streams;
   formatting said individual channel streams into a-law format;
   remultiplexing said formatted channel streams;
   wherein said step of remultiplexing further comprises the steps of:
   adding a sync byte to each frame; and
   adding idle bit patterns to unused channels so as to complete the requisite thirty one channels for a E1 frame;
   analyzing said channel streams to determine their contents;
   reformatting and outputting said channel streams;
   demultiplexing said reformatted said channel streams;
   converting said demultiplexed channel streams to analog channels; and
   outputting said analog channels.

2. Method of claim 1, wherein IF said input frequencies are in the range of 40 megahertz to 170 megahertz, THEN said step of translating further comprises the step of translating said input frequencies to a 10 megahertz intermediate frequency.

3. Method of claim 1, wherein said step of demodulating, said PSK signal has a symbol rate ranging from 2.4 kilobits per second to 3.8 megabits per second.

4. Method of claim 1, wherein said step of demodulating, said FSK or OOK signal has an amplitude ranging from 0.1 volts to 10 volts and a data rate ranging from 100 bits per second to 5 megabits per second.

5. Method of claim 1, wherein said step of formatting is 8 kilohertz sampled.

6. Method of claim 1, wherein said step of analyzing further comprises the step of identifying whether said channel contents are voice, digital data, modem, noise, Voice Frequency Telegraphy (VFT) or unknown.

7. Method of claim 6, further comprising the step of determining modem type.

8. Method of claim 1, wherein said step of reformatting and outputting said channel streams further comprises reformatting and outputting said streams in either Transistor to Transistor Logic (TTL), Low Voltage Differential Signaling (LVDS) format or High Density Bi-Polar 3-Phase (HDB3) format.

9. Apparatus for processing time division multiplexed signals, comprising:
 means for translating input frequencies to an intermediate frequency range, if necessary;
 means for determining whether a Phase Shift Keyed (PSK) or a Frequency Shift Keyed (FSK) or On-Off Keyed (OOK) modulation-type signal is present;
 means for demodulating said signal using said determined modulation-type so as to produce a digital data bit stream;
 means for bit synchronizing said digital data bit stream with a rate clock;
 means for stripping and decoding digital protocol from said digital data bit stream;
 means for digitally reformatting said digital data bit stream;
 means for synchronizing frames of said digital data bit stream;
 means for assigning said synchronized frames of digital data to channels;
 means for extracting said channel-assigned frames of digital data into individual channel streams;
 means for formatting said individual channel streams into a-law format;
 means for remultiplexing said formatted channel streams;
  wherein said means for remultiplexing further comprises:
  means for adding a sync byte to each frame; and
  means for adding idle bit patterns to unused channels so as to complete the requisite thirty one channels for a E1 frame;
 means for analyzing said channel streams to determine their contents;
 means for reformatting and means for outputting said channel streams;
 means for demultiplexing said reformatted said channel streams;
 means for converting said demultiplexed channel streams to analog channels; and
 means for outputting said analog channels.

10. Apparatus as in claim 9, further comprising means for determining whether said input frequencies are in the range of 40 megahertz to 170 megahertz,
 IF said input frequencies are in the range of 40 megahertz to 170 megahertz THEN said means for determining further comprises means for translating said input frequencies to a 10 megahertz intermediate frequency.

11. Apparatus as in claim 9, wherein said means for demodulating, said PSK signal has a symbol rate ranging from 2.4 kilobits per second to 3.8 megabits per second.

12. Apparatus as in claim 9, wherein said means for demodulating, said FSK or OOK signal has an amplitude ranging from 0.1 volts to 10 volts and a data rate ranging from 100 bits per second to 5 megabits per second.

13. Apparatus as in claim 9, wherein said means for formatting is 8 kilohertz sampled.

14. Apparatus as in claim 9, wherein said means for analyzing further comprises means for identifying whether said channel contents are voice, digital data, modem, noise, Voice Frequency Telegraphy (VFT) or unknown.

15. Apparatus as in claim 14, further comprising means for determining modem type.

16. Apparatus as in claim 9, wherein said means for reformatting and means for outputting said channel streams further comprises means for reformatting and means for outputting said streams in either Low Voltage Differential Signaling (LVDS) format or High Density Bi-Polar 3-Phase (HDB3) format.

* * * * *